United States Patent [19]

Kim

[11] Patent Number: 5,631,996

[45] Date of Patent: May 20, 1997

[54] NTSC/PAL-M DISCRIMINATION CIRCUIT AND CHROMINANCE SIGNAL REPRODUCING METHOD

[75] Inventor: Haeng-seon Kim, Suwon, Rep. of Korea

[73] Assignee: Samsung Electronics Co., Ltd., Kyungki-do, Rep. of Korea

[21] Appl. No.: 568,691

[22] Filed: Dec. 7, 1995

[30] Foreign Application Priority Data

Dec. 8, 1994 [KR] Rep. of Korea ............... 94-33356

[51] Int. Cl.$^6$ .................................................. H04N 9/79
[52] U.S. Cl. ...................................... 386/35; 386/41
[58] Field of Search .......................... 386/1, 26, 28, 386/35, 41, 44, 24; H04N 9/79

[56] References Cited

U.S. PATENT DOCUMENTS

| | | | |
|---|---|---|---|
| 4,188,638 | 2/1980 | De Haan | 386/35 |
| 4,991,027 | 2/1991 | Enoki | 386/35 |
| 5,394,275 | 2/1995 | Iketani et al. | 386/35 |
| 5,550,640 | 8/1996 | Tsuboi et al. | 386/35 |

Primary Examiner—Thai Tran
Attorney, Agent, or Firm—Sughrue, Mion, Zinn, Macpeak & Seas

[57] ABSTRACT

A circuit discriminates a broadcasting system of a signal recorded in a video tape and is used in a method for reproducing a chrominance signal adopting the circuit. The circuit has: a chrominance signal demodulator for demodulating a chrominance signal from a down-converted chrominance signal, in response to a head switching pulse and a broadcasting system discrimination signal for discriminating the NTSC and PAL-M systems. A phase difference detector is connected to the chrominance signal demodulator for detecting a phase difference between the demodulated chrominance signal output from the chrominance signal demodulator and a reference chrominance signal. An error discriminator generates an error signal indicating the accordance between a broadcasting system which is designated by the broadcasting system discrimination signal and that of the down-converted chrominance signal, based upon the output status of the phase difference detector. The broadcasting system discrimination signal itself is generated in response to the error signal provided from the error discriminator. Thereby, based upon detected phase difference errors, the chrominance signal demodulator functions according to the correct broadcast system so as to compatible with the broadcast system used in recording to the videotape.

5 Claims, 3 Drawing Sheets

NTSC/PAL-M DISCRIMINATION CIRCUIT AND CHROMINANCE SIGNAL REPRODUCING METHOD

BACKGROUND OF THE INVENTION

The present invention relates to a videocassette recorder for reproducing a video signal recorded by more than one broadcasting system, and more particularly, to a circuit for discriminating the recording broadcasting system of a video signal recorded on a video tape, and to a method for reproducing a chrominance signal by using the circuit.

The VHS recording system is characterized in that there is no interval, i.e., guard band, between the tracks where a video signal is recorded, which, though enabling high-density recording, tends to generate inter-track crosstalk in a system. Therefore, to reduce the effects of crosstalk, such a system employs an azimuth angle whose reduction effect is greater at higher frequencies. Accordingly, the luminance signal of a picture signal exhibits little crosstalk since it is recorded in a higher frequency band, while the chrominance signal, being recorded in a lower frequency band, experiences a relatively high degree of crosstalk.

To prevent the generation of the crosstalk, in a VHS type videocassette recorder, the chrominance signal is recorded while being phase-shifted every horizontal scanning line. That is, the CH-1 and CH-2 heads alternately record signals from the lower right to the upper left along a video tape.

In recording a signal by the NTSC broadcasting system, the CH-1 head records by shifting the phases of a first, second, third and fourth horizontal scanning line of a recorded signal, to 0°, +90°, +180° and +270°, respectively. That is, the CH-1 head records the signal by shifting the phase of each horizontal scanning line by 90°. Meanwhile, the CH-2 head records signals by delaying the phase by 90°, i.e., −90°, −180°, −270° and −360°.

During reproduction, the phase is shifted conversely with respect to the recording operation.

In recording the signal by the PAL system, the CH-1 head does not shift the phase and the CH-2 head makes the phase lag by 90° for every horizontal scanning line. During reproduction, the CH-1 head does not shift the phase and the CH-2 head makes the phase lead by 90° for every horizontal scanning line.

The PAL broadcasting system includes PAL-B, PAL-C and PAL-M types. The vertical sync frequency of the PAL-B and PAL-C systems is 50 Hz, while that of the PAL-M system is 60 Hz and thus is the same as the NTSC broadcasting system.

When signals recorded in a video tape by different broadcasting system are reproduced, a reproducing mode of a tape recorder should be adjusted to corresponding to the broadcasting system of the recorded signal.

In a conventional videocassette recorder, the corresponding broadcasting system to the tape is selected by the combination of switches or, sequentially searched by using a microcomputer and a tact switch. This, however, necessitates the generation of a control signal corresponding to each broadcasting system, which complicates the hardware or encumbers a user with additional manipulation.

SUMMARY OF THE INVENTION

To solve the above problems, it is an object of the present invention to provide & circuit for automatically discriminating the broadcasting system of a video signal in a videocassette recorder for reproducing the video signal recorded on a video tape by either the NTSC system or the PAL-M system.

It is another object of the present invention to provide a method for reproducing a chrominance signal by utilizing the above circuit.

Accordingly, to achieve the first object, there is provided a broadcasting system discrimination circuit for use in a videocassette recorder compatible with both the NTSC and PAL-M broadcasting systems, the circuit comprising: a chrominance signal demodulator for demodulating a chrominance signal from a down-converted chrominance signal reproduced by a head, in response to a broadcasting system discrimination signal for discriminating the NTSC and PAL-M systems and a head switching pulse; a phase difference detector being connected to the chrominance signal demodulator and for detecting phase difference between the demodulated chrominance signal output from the chrominance signal demodulator and a reference chrominance signal; an error discriminator being connected to the phase difference detector and for generating an error signal indicating the accordance between a broadcasting system which is designated by the broadcasting system discrimination signal and that of the down-converted chrominance signal, by checking an output status of the phase difference detector; and a broadcasting system discrimination signal generator for generating the broadcasting system discrimination signal in response to the error signal provided from the error discriminator.

To achieve the second object, there is provided a method for reproducing a chrominance signal in a videocassette recorder compatible with the NTSC and PAL-M broadcasting systems, the method comprising the steps of: (a) determining whether the frequency of a recorded control signal is 50 Hz or 60 Hz; (b) demodulating a chrominance signal from a down-converted chrominance signal reproduced by a head using one of the broadcasting systems, if the control signal frequency is 60 Hz; (c) checking the occurrence of a periodic phase error by comparing the demodulated chrominance signal and a reference chrominance signal; and (d) demodulating the chrominance signal by changing the broadcasting system of the step (b) to the other broadcasting system, if the periodic phase error occurs in the step (c).

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
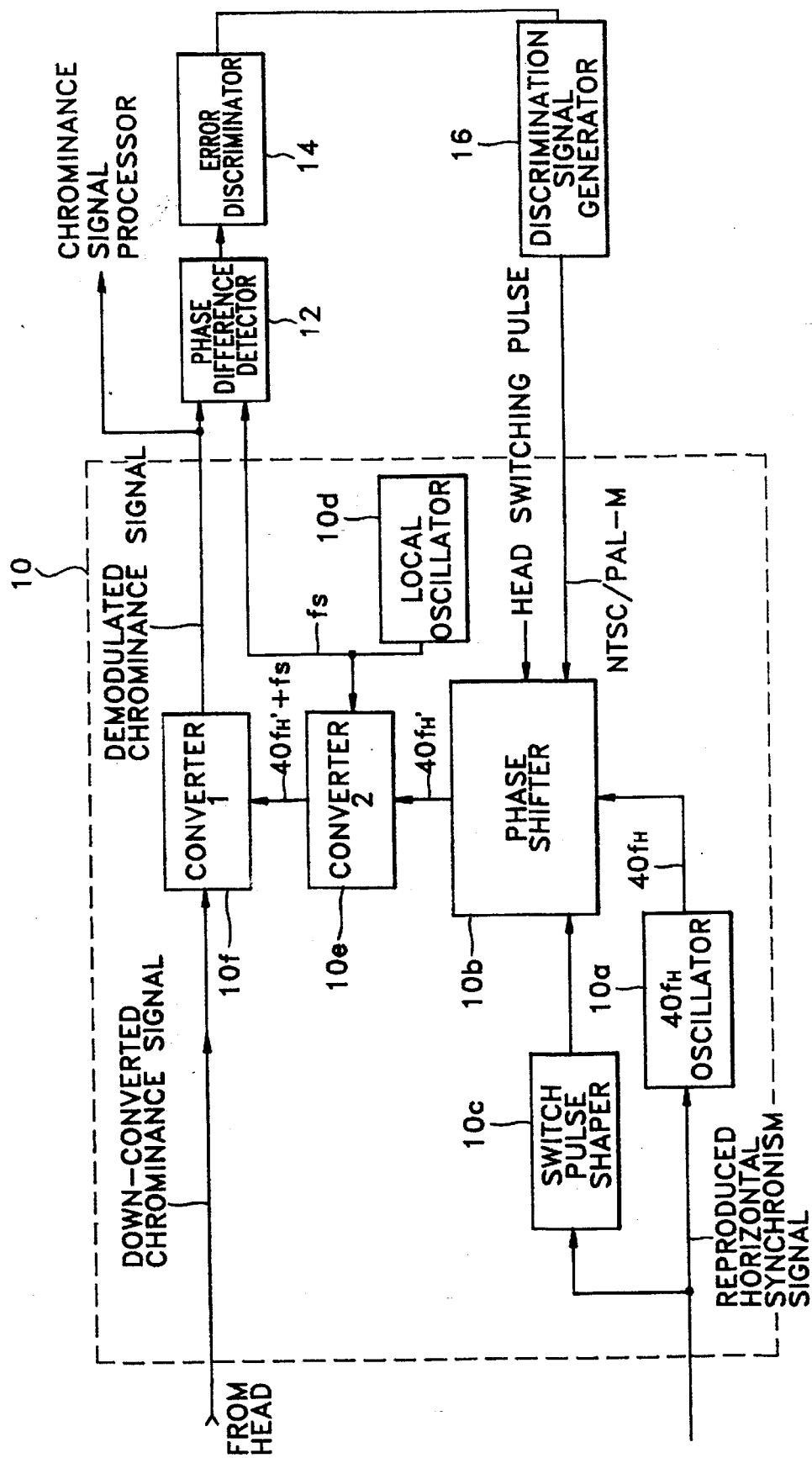
FIG. 1 is a block diagram illustrating a circuit for discriminating a broadcasting system according to the present invention.

FIG. 1 is a block diagram showing a structure of a discrimination circuit according to the present invention. In the drawing, a reference numeral 10 denotes a chrominance signal demodulating circuit; a reference numeral 12 denotes a phase difference detector; a reference numeral 14 denotes an error discriminator; and a reference numeral 16 denotes an NTSC/PAL-M discrimination signal generator.

Chrominance signal demodulator 10 comprises a $40f_H$ oscillator 10a for receiving a horizontal sync signal detected from a luminance signal and generating a first oscillation signal $40f_H$ having a frequency of $40f_H$ (here, $f_H$ denotes the horizontal sync signal frequency), a phase shifter 10b for phase-shifting and outputting the first oscillation signal $40f_H$ generated from $40f_H$ oscillator 10a in response to an applied NTSC/PAL-M discrimination signal and a head switching pulse, a second convertor 10e for mixing a first oscillation signal $40f_H{'}$ output from phase shifter 10b with a second oscillation signal $f_S$ having a frequency of a chrominance subcarrier output from a local oscillator 10d and generating a mixed signal $40f_H{'}+f_S$, and a first convertor 10f for mixing a down-converted chrominance signal reproduced by a head with the mixed signal $40f_H{'}+f_S$ generated from second convertor 10e and outputting a demodulated chrominance signal. Here, a reference numeral 10c denotes a pulse shaper.

Since the operation of chrominance signal demodulator 10 having such a structure is well-known, the detailed description thereof is omitted.

Phase difference detector 12 detects the phase difference between a reference color subcarrier output from local oscillator 10d and a demodulated chrominance signal output from first convertor 10f of chrominance signal demodulator 10. When a broadcasting system discriminated by the NTSC/PAL-M discrimination signal applied to phase shifter 10b of chrominance signal demodulator 10 and a broadcasting system of the down-converted chrominance signal reproduced by the head are congruous, phase difference detector 12 outputs a digital signal of a low level. Conversely, a digital signal of a high level is output when the broadcasting systems are not congruous.

Error discriminator 14 discriminates the alternating status of an output of phase detector 12 and outputs an error signal indicating that discrimination of the broadcasting system is incorrect according to the above discrimination.

Figure 2A:
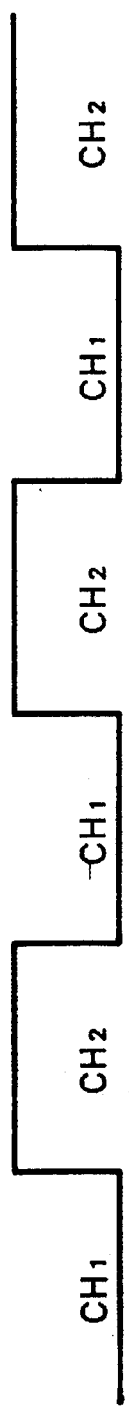
FIGS. 2A–2D are views for explaining the operation of the circuit shown in FIG. 1.
Figure 2B:
Figure 2C:
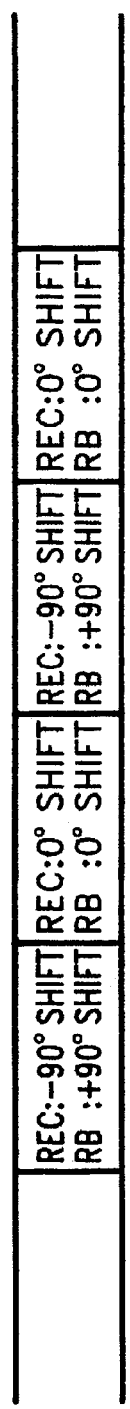
Figure 2D:
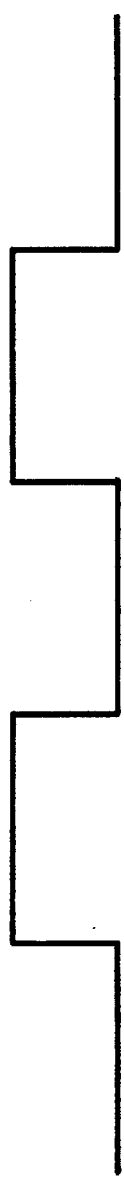

FIGS. 2A to 2D are views for explaining the operation of the circuit shown in FIG. 1, wherein FIG. 2A shows the head switching pulse; FIG. 2B shows a phase shifting operation of the NTSC system; FIG. 2C shows a phase shifting operation of the PAL-M system; and FIG. 2D shows a waveform of the signal output from phase difference detector 12 in case that the broadcasting system of the down-converted chrominance signal reproduced by the head and the system set in chrominance signal demodulator 10 do not accord with each other.

In the NTSC and PAL-M systems, the phase shifting methods of CH-2 are the same, however, both are not congruous in CH-1. Accordingly, when the broadcasting system of the down-converted chrominance signal reproduced by the head and the system set in the chrominance signal demodulator do not accord with each other, a phase difference of 90° is detected in the CH-1 section.

For instance, if the broadcasting system of the down-converted chrominance signal reproduced by the head is the PAL-M system and the system set in the chrominance signal demodulator is the NTSC system, phase difference detector 12 generates a digital signal of a high-level in the CH-1 section of the head switching pulse.

Error discriminator 14 is triggered by the signal output from phase difference detector 12 and outputs the error signal of a high-level as shown in FIG. 2D. When the digital signal of a high-level is output from error discriminator 14, NTSC/PAL-M discrimination signal generator 16 outputs a discrimination signal of the level contrary to that of a currently outputting NTSC/PAL-M discrimination signal.

Figure 3:
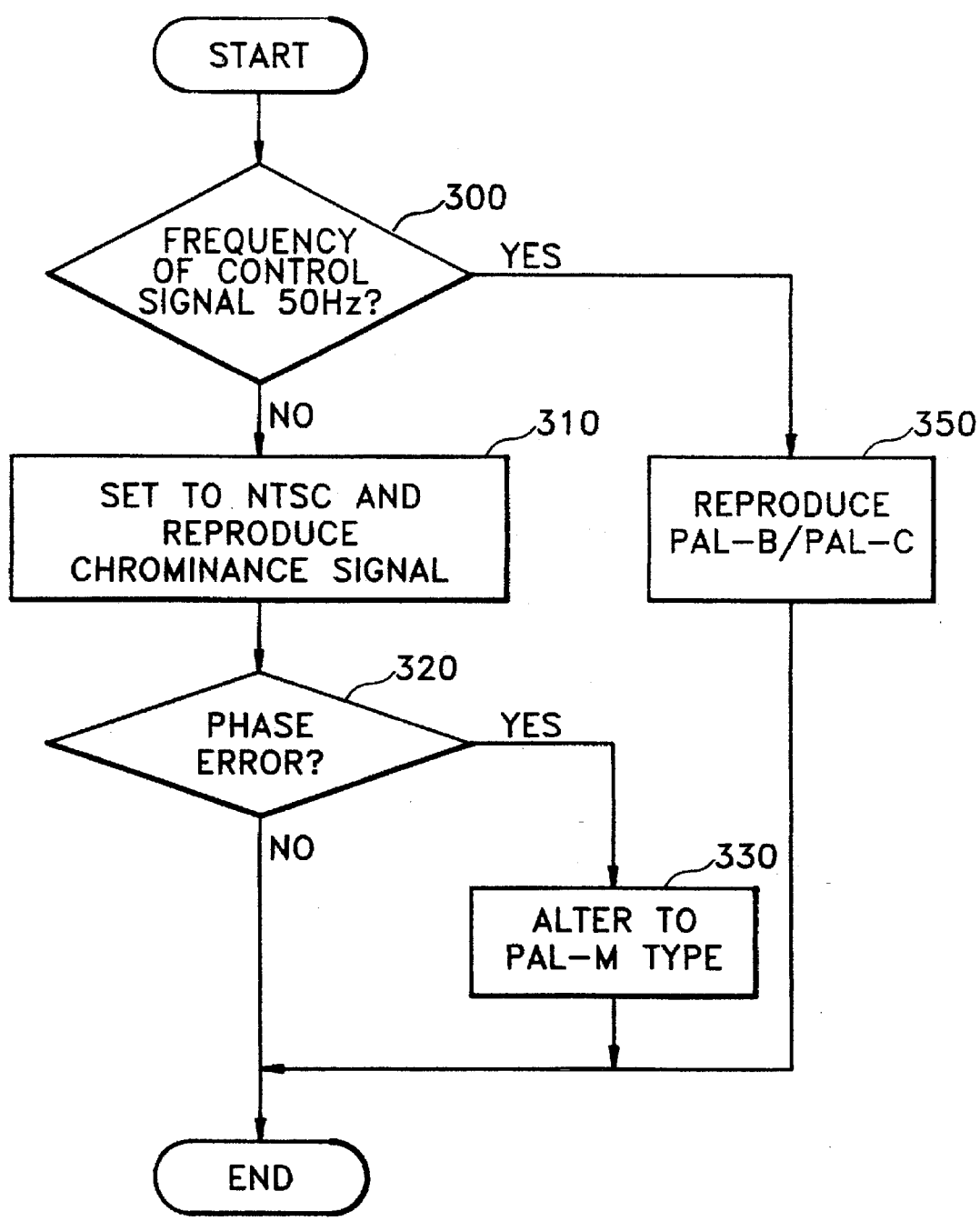
FIG. 3 is a flowchart for explaining a method for reproducing a chrominance signal according to the present invention.

FIG. 3 is a flowchart for explaining a method of reproducing the chrominance signal according to the present invention.

In step 300, when a videocassette recorder is set to a play mode, the frequency of a control signal recorded in the video tape is primarily detected. If the frequency of the control signal is 50 Hz, PAL-B/PAL-C reproduction is performed in step 350. If that of the control signal is 60 Hz, NTSC/PAL-M reproduction is performed in step 310.

In step 310, the broadcasting system of chrominance signal demodulator 10 is set initially to the NTSC system (or alternatively the PAL-M system) and then a chrominance signal is demodulated from the down-converted chrominance signal reproduced by the head.

In step 320, the occurrence of the phase error is checked in the CH-1 section of the head switching pulse by comparing the demodulated chrominance signal and the reference chrominance signal.

If phase error is detected in step 320, the system of the chrominance signal demodulator 10 is converted into the other system different from the preset broadcasting system, in step 330. That is, if step 310 initially sets the chrominance signal demodulator to NTSC, then step 330 changes it to PAL-M, and vice versa.

If the phase error is not checked in step 320, the preset broadcasting system of the chrominance signal demodulator 10 is maintained.

As described above, the NTSC/PAL-M systems discrimination circuit of the videocassette recorder and the chrominance signal reproducing method according to the present invention automatically discriminates the NTSC and PAL-M systems, so that the circuit has effects of facilitating the use of a videocassette recorder by a user and simplifying the structure of the hardware.

What is claimed is:

1. A broadcasting system discrimination circuit for use in a video cassette recorder compatible with at least two different broadcasting systems, said circuit comprising:

a chrominance signal demodulator for demodulating a chrominance signal from a down-converted chrominance signal reproduced by a head, in response to a broadcasting system discrimination signal and a head switching pulse, and producing as an output a demodulated chrominance signal;

a phase difference detector being connected to said chrominance signal demodulator and for detecting a phase difference between said demodulated chrominance signal and a reference chrominance signal;

an error discriminator being connected to said phase difference detector and for generating an error signal indicating the accordance between a broadcasting system which is designated by the broadcasting system discrimination signal and that of the down-converted chrominance signal, by monitoring said phase difference detected by said phase difference detector; and a broadcasting system discrimination signal generator, connected to said error discriminator, for generating the broadcasting system discrimination signal in response to the error signal generated by said error discriminator.

2. A method for reproducing a chrominance signal in a videocassette recorder compatible with first and second broadcasting systems, said method comprising the steps of:

(a) determining the frequency of a recorded control signal, among first and second frequencies;

(b) demodulating a chrominance signal from a down-converted chrominance signal reproduced by a head using the first broadcasting system, if the frequency of said control signal is the first frequency;

(c) checking the occurrence of a periodic phase error by comparing the demodulated chrominance signal and a reference chrominance signal; and (d) demodulating the chrominance signal by changing the broadcasting system of said step (b) to the second broadcasting system, if the periodic phase error occurs in said step (c).

3. The method for reproducing a chrominance signal as claimed in claim 2, wherein said first frequency is 60 Hz and said second frequency is 50 Hz.

4. The method for reproducing a chrominance signal as claimed in claim 2, wherein said first broadcasting system is an NTSC system and said second broadcasting system is a PAL-M system.

5. The broadcasting system discrimination circuit as claimed in claim 1, wherein the at least two different broadcasting systems include the NTSC and PAL-M systems, and wherein the broadcasting system discrimination signal discriminated between the NTSC and PAL-M systems.

* * * * *